UNITED STATES PATENT OFFICE.

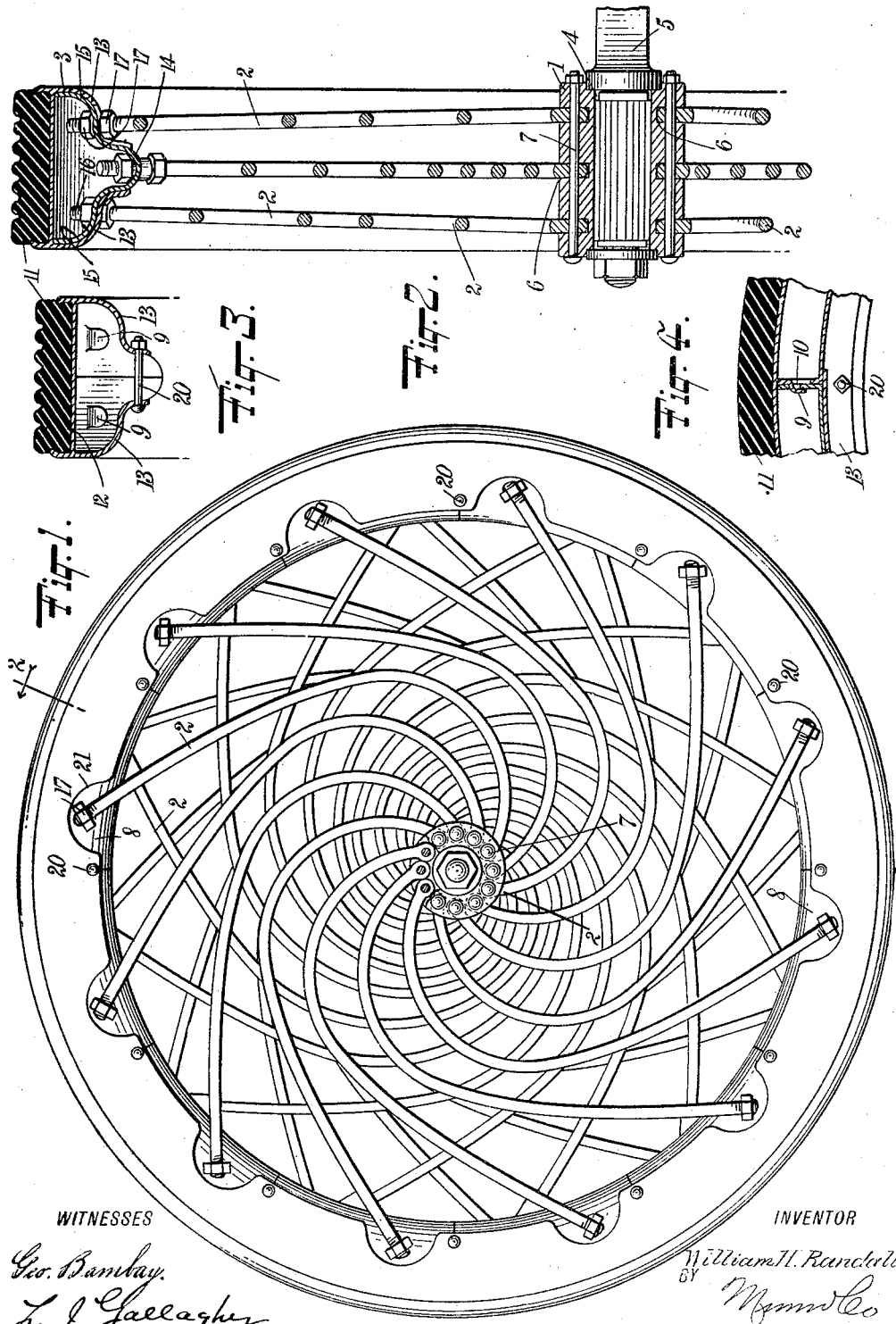

WILLIAM HENRY RANDALL, OF KANSAS CITY, KANSAS.

RESILIENT WHEEL.

1,121,665.   Specification of Letters Patent.   Patented Dec. 22, 1914.

Application filed October 17, 1911. Serial No. 655,141.

*To all whom it may concern:*

Be it known that I, WILLIAM HENRY RANDALL, a citizen of the United States, and a resident of Kansas City, in the county of Wyandotte and State of Kansas, have invented a new and Improved Resilient Wheel, of which the following is a full, clear, and exact description.

My invention comprehends a resilient wheel, and the principal object thereof is to provide a new and improved construction in devices of this class, the new and novel features thereof appearing as the description thereof proceeds, all of which is more particularly pointed out and included within the appended claims.

Reference is to be had to the accompanying drawings forming a part of this specification, in which similar characters of reference indicate corresponding parts in all the figures.

Figure 1 is a side view of the wheel partly in section; Fig. 2 is a sectional view thereof on the line 2—2 of Fig. 1; Fig. 3 is an end view of one of the adjacent rim sections; and Fig. 4 is a partial vertical sectional view, showing the method of connection, part of which is illustrated in Fig. 3.

The wheel is made up of a hub 1, a plurality of resilient spokes or hangers 2 together with a suitable rim 3, all of the parts being suitably held together, whereby a compact and efficient structure is provided.

The hub 1 comprises a body portion having an opening 4 extending longitudinally thereof, adapted to engage one end of any suitable axle 5, the hub being also provided with a plurality of recesses or openings 6 suitably spaced therearound, adapted to receive the inner ends of the resilient spokes or hangers 2. Referring particularly to Fig. 1, it is to be noted that the hub is provided with a number of longitudinally-extending pins 7, which in this instance are 12 in number; the pins pass through the recesses or openings 6, shown in Fig. 2, whereby three hangers or spokes are supported on each pin.

The rim 3 is shown made up of twelve sections, each of which is 30° of the circumference, the sections being equal in number to the pins 7, and each section being in engagement with the outer ends of the spokes 2, the spokes which are in engagement with any one pin, all being in engagement at their outer ends with the same section; as shown in Fig. 1, each pin supports three spokes, and each section of the rim is in engagement with the outer ends of these spokes, although, of course, it is clear that the number of spokes from each pin could be varied, the inventive idea residing in the relation of the parts and not in the particular number thereof.

In order to provide for sufficient resiliency as the wheel rolls over the ground, and to enable the shocks due to unevenness thereof to be suitably taken up, each of the spokes 2 is curved, as shown in Fig. 1, the curvature of each spoke being substantially identical with the curvature of every other spoke.

Referring particularly to Figs. 3 and 4, each section 8 of the rim is provided at one end thereof with tongues 9, these tongues being adapted to engage in openings 10 in the end of an adjacent section, all of the sections when thus joined together constituting the rim proper. In Fig. 2 this rim is shown in section and made up of the curved side portions 15 with the intermediate downwardly extending portion 14, the outer ends of the spokes 2 being threaded as at 16 and provided with lock nuts 17 adapted to engage on opposite sides of the rim whereby these parts are positioned.

In order to provide a suitable pocket or retaining means for a tire, such as a resilient one 11, I provide the construction shown especially in Fig. 2 which embodies the converging side portions 13 shaped to conform to the curvature of the rim 14, 15, together with the intermediate partition 12; the resilient tire 11 is seated between the outer ends of the converging side portions 13 and the partition whereby it is held in position in a structure resembling a pocket. These side portions 13 are secured in position to the tire sections by any means, such as bolts and nuts 20.

Referring particularly to Fig. 1 it will be noted that where the outer end of each third spoke passes into engagement with the rim one of the converging sides 13 is cut away as at 21 to permit entrance of the spoke.

When the wheel is in use supported on a suitable axle, shocks due to unevenness in the road as the wheel passes thereover will be taken up by the resilient spokes, due to their peculiar construction, and when any one section of the rim is bearing against the ground tending to support the weight resting on the axle, this weight is carried by three spokes which in turn are supported on a single pin. Such a construction provides that the load on the axle will be successively distributed at diametrically opposite points as the wheel rolls over the ground, any movement or displacement of the rim being taken up by all of the spokes. The material of which the hub and spokes is made will depend primarily on the ultimate cost of the wheel desired, such changes and those in finish and workmanship being largely matters of choice and expediency.

Having thus described my invention, I claim as new, and desire to secure by Letters Patent:—

1. A resilient wheel, comprising a hub having peripheral recesses, curved resilient spokes pivoted in the recesses of the hub, a substantially U-shaped rim formed of sections detachably secured together and to which the outer ends of the spokes are detachably secured, a tire seat resting upon the upper edges of the rim and having outwardly and inwardly extending members, the inwardly extending members being curved and fitting upon the sides of said rim, and bolts passing through the members of the tire seat and the rim.

2. A resilient wheel, comprising a hub having peripheral recesses arranged in rows extending longitudinally of the hub, a substantially U-shaped rim formed of segments detachably secured together, curved resilient spokes having their inner ends pivoted in the recesses of the hub and having threaded outer ends projecting into the rim and provided with nuts engaging opposite sides of said rim the spokes of each row of recesses being secured to the same section of the rim, and a tire seat secured on the said rim.

In testimony whereof I have signed my name to this specification in the presence of two subscribing witnesses.

WILLIAM HENRY RANDALL.

Witnesses:
L. E. MILLER,
J. V. FIFE.

Copies of this patent may be obtained for five cents each, by addressing the "Commissioner of Patents, Washington, D. C."